(12) United States Patent
Vehr et al.

(10) Patent No.: US 10,328,771 B2
(45) Date of Patent: Jun. 25, 2019

(54) SYSTEM AND METHOD OF CONTROLLING AN OIL RETURN CYCLE FOR A REFRIGERATED CONTAINER OF A VEHICLE

(71) Applicant: Emerson Climate Technologies, Inc., Sidney, OH (US)

(72) Inventors: Shawn W. Vehr, Dayton, OH (US); Joseph James Rozsnaki, Troy, OH (US)

(73) Assignee: Emerson Climated Technologies, Inc., Sidney, OH (US)

( * ) Notice: Subject to any disclaimer, the term of this patent is extended or adjusted under 35 U.S.C. 154(b) by 199 days.

(21) Appl. No.: 15/635,239

(22) Filed: Jun. 28, 2017

(65) Prior Publication Data

US 2018/0001742 A1 Jan. 4, 2018

Related U.S. Application Data

(60) Provisional application No. 62/356,608, filed on Jun. 30, 2016.

(51) Int. Cl.
*B60H 1/32* (2006.01)
*B60H 1/00* (2006.01)

(52) U.S. Cl.
CPC ........ *B60H 1/3214* (2013.01); *B60H 1/005* (2013.01); *B60H 1/00428* (2013.01);
(Continued)

(58) Field of Classification Search
CPC ...... B60H 1/005; B60H 1/3211; B60H 1/323; B60H 2001/3255; B60H 1/3232;
(Continued)

(56) References Cited

U.S. PATENT DOCUMENTS 2,895,308 A 7/1959 Mcneil
4,043,144 A 8/1977 Klotz et al.
(Continued)

FOREIGN PATENT DOCUMENTS

JP 2002130891 A 5/2002
JP 4354372 B2 10/2009
(Continued)

OTHER PUBLICATIONS

Lyon: "An All Electric Refrigerated Truck for Nestlé Switzerland," Renault Trucks Deliver Press Release, Corporate Communications Department; Jun. 2012; 2 Pages.
(Continued)

*Primary Examiner* — Frantz F Jules
*Assistant Examiner* — Lionel Nouketcha
(74) *Attorney, Agent, or Firm* — Harness, Dickey & Pierce, P.L.C.

(57) ABSTRACT

A compressor compresses a refrigerant. A eutectic plate cools a refrigerated space. An evaporator cools the refrigerated space. A mixture of the refrigerant and an oil flows through the evaporator and the eutectic plate. A control module controls the compressor, a first valve that permits or prevents flow of the mixture to the eutectic plate, and a second valve that permits or prevents flow of the mixture to the evaporator. In response to a temperature of the refrigerated space being greater than a predetermined temperature, the control module: increases a speed of the compressor; operates the compressor at the increased speed for a predetermined time period; after the predetermined period: opens the second valve; and closes the first valve, where the control module opens the second valve before closing the first valve, and decreases the speed of the compressor after closing the first valve.

20 Claims, 10 Drawing Sheets

(52) U.S. Cl.
CPC .............. *B60H 2001/3255* (2013.01); *B60H 2001/3266* (2013.01); *B60H 2001/3272* (2013.01); *B60H 2001/3283* (2013.01); *F25B 2400/0409* (2013.01); *F25B 2400/13* (2013.01); *Y02T 10/88* (2013.01)

(58) Field of Classification Search
CPC .... B60H 2001/3272; B60H 2001/3283; F25B 2400/0409; F25B 2400/13
See application file for complete search history.

(56) References Cited

U.S. PATENT DOCUMENTS

| | | | |
|---|---|---|---|
| 4,328,855 A | | 5/1982 | Iwata et al. |
| 4,616,484 A | | 10/1986 | Mehdi et al. |
| 4,658,593 A | * | 4/1987 | Stenvinkel ............ F25D 29/00 62/126 |
| 5,265,435 A | | 11/1993 | Richardson |
| 5,395,224 A | | 3/1995 | Caillat et al. |
| 5,651,260 A | | 7/1997 | Goto et al. |
| 5,929,609 A | | 7/1999 | Joy et al. |
| 6,230,507 B1 | | 5/2001 | Ban et al. |
| 6,411,059 B2 | | 6/2002 | Frugier et al. |
| 6,543,245 B1 | | 4/2003 | Waldschmidt et al. |
| 6,622,505 B2 | | 9/2003 | Anderson et al. |
| 6,640,564 B2 | | 11/2003 | Yamashita et al. |
| 6,889,762 B2 | | 5/2005 | Zeigler et al. |
| 7,040,877 B2 | | 5/2006 | Bergman et al. |
| 7,174,736 B2 | | 2/2007 | Chen et al. |
| 7,398,653 B2 | | 7/2008 | Oomura et al. |
| 7,591,143 B2 | | 9/2009 | Zeigler et al. |
| 7,832,221 B2 | | 11/2010 | Wijaya et al. |
| 7,963,117 B2 | | 6/2011 | Allen et al. |
| 7,966,839 B2 | | 6/2011 | McEnaney et al. |
| 8,123,490 B2 | | 2/2012 | Goto et al. |
| 8,161,758 B2 | | 4/2012 | Bailey et al. |
| 8,181,478 B2 | | 5/2012 | Ignatiev |
| 8,342,810 B2 | | 1/2013 | Koyama |
| 8,453,722 B2 | | 6/2013 | Zeigler et al. |
| 8,534,082 B2 | | 9/2013 | Price et al. |
| 8,672,642 B2 | | 3/2014 | Tolbert, Jr. et al. |
| 8,723,458 B1 | | 5/2014 | Chambers |
| 8,769,982 B2 | | 7/2014 | Ignatiev et al. |
| 8,935,933 B1 | | 1/2015 | Koelsch |
| 9,126,544 B2 | | 9/2015 | Larson et al. |
| 9,194,393 B2 | | 11/2015 | Pham |
| 9,557,100 B2 | | 1/2017 | Chopko et al. |
| 9,688,181 B2 | | 6/2017 | Dutta et al. |
| 9,689,598 B2 | | 6/2017 | Truckenbrod et al. |
| 2003/0077179 A1 | | 4/2003 | Collins et al. |
| 2003/0106332 A1 | | 6/2003 | Okamoto et al. |
| 2003/0118450 A1 | | 6/2003 | Iwanami et al. |
| 2003/0136138 A1 | | 7/2003 | Tsuboi et al. |
| 2003/0201097 A1 | | 10/2003 | Zeigler et al. |
| 2004/0231831 A1 | | 11/2004 | Houck et al. |
| 2006/0151163 A1 | | 7/2006 | Zeigler et al. |
| 2007/0052241 A1 | | 3/2007 | Pacy |
| 2007/0056300 A1 | | 3/2007 | Crane |
| 2007/0151273 A1 | | 7/2007 | Nelson et al. |
| 2007/0209378 A1 | * | 9/2007 | Larson ................... B60H 1/005 62/239 |
| 2008/0011007 A1 | | 1/2008 | Larson et al. |
| 2008/0014852 A1 | | 1/2008 | Mielke et al. |
| 2008/0034773 A1 | | 2/2008 | Karapetian |
| 2009/0011007 A1 | | 1/2009 | Meier et al. |
| 2010/0011788 A1 | | 1/2010 | Lifson et al. |
| 2010/0076664 A1 | | 3/2010 | Monros |
| 2010/0080713 A1 | | 4/2010 | Douglas et al. |
| 2010/0178175 A1 | | 7/2010 | Koyama |
| 2010/0180614 A1 | | 7/2010 | Larson et al. |
| 2011/0110791 A1 | | 5/2011 | Donnat et al. |
| 2012/0152511 A1 | | 6/2012 | Chang et al. |
| 2012/0198869 A1 | * | 8/2012 | Morita ................. B60H 1/3208 62/126 |
| 2012/0262881 A1 | | 10/2012 | Onimaru et al. |
| 2012/0290161 A1 | | 11/2012 | Takeda et al. |
| 2013/0054072 A1 | | 2/2013 | Christen et al. |
| 2013/0199223 A1 | | 8/2013 | Brooke et al. |
| 2013/0248165 A1 | | 9/2013 | Kandasamy |
| 2013/0333398 A1 | * | 12/2013 | Wendrock ............. F25B 39/028 62/56 |
| 2014/0020097 A1 | | 1/2014 | Riou |
| 2014/0023519 A1 | | 1/2014 | Li |
| 2014/0026599 A1 | | 1/2014 | Rusignuolo et al. |
| 2014/0116673 A1 | | 5/2014 | Kang et al. |
| 2014/0137580 A1 | | 5/2014 | Peyaud et al. |
| 2014/0208789 A1 | | 7/2014 | Lombardo et al. |
| 2014/0308138 A1 | | 10/2014 | Pham |
| 2014/0311180 A1 | | 10/2014 | Kawakami et al. |
| 2014/0338376 A1 | | 11/2014 | Carpenter et al. |
| 2015/0013361 A1 | | 1/2015 | Senf, Jr. et al. |
| 2015/0188360 A1 | | 7/2015 | Doane et al. |
| 2015/0224852 A1 | | 8/2015 | Wiedemann et al. |
| 2015/0314671 A1 | | 11/2015 | Rajtmajer et al. |
| 2015/0352925 A1 | | 12/2015 | Olyleye et al. |
| 2016/0061504 A1 | | 3/2016 | Penn, II et al. |
| 2016/0144765 A1 | | 5/2016 | Viegas et al. |
| 2016/0159339 A1 | | 6/2016 | Cho et al. |
| 2016/0334154 A1 | | 11/2016 | Srichai et al. |
| 2016/0361975 A1 | | 12/2016 | Blatchley et al. |
| 2017/0100987 A1 | | 4/2017 | Chopko et al. |
| 2017/0151859 A1 | | 6/2017 | Dykes et al. |
| 2018/0001731 A1 | | 1/2018 | Vehr et al. |
| 2018/0001738 A1 | | 1/2018 | Vehr et al. |
| 2018/0001739 A1 | | 1/2018 | Vehr et al. |
| 2018/0001740 A1 | | 1/2018 | Vehr et al. |
| 2018/0001744 A1 | | 1/2018 | Vehr et al. |
| 2018/0001745 A1 | | 1/2018 | Vehr et al. |
| 2018/0001746 A1 | | 1/2018 | Vehr et al. |
| 2018/0041137 A1 | | 2/2018 | Iwata et al. |

FOREIGN PATENT DOCUMENTS

| | | |
|---|---|---|
| KR | 101462575 B1 | 11/2014 |
| WO | WO-0049349 A1 | 8/2000 |
| WO | WO-2015090191 A1 | 6/2015 |
| WO | WO-2016147022 A1 | 9/2016 |

OTHER PUBLICATIONS

Notice of Allowance and Fees Due regarding U.S. Appl. No. 15/635,760 dated Feb. 20, 2019.
Vijayenthiran, Viknesh "Mercedes beats Tesla to electric truck," Motor Authority; FoxNews.com; Published Oct. 11, 2016 <https://www.foxnews.com/auto/mercedes-beats-tesla-to-electric-truck>.
Election/Restriction Requirement regarding U.S. Appl. No. 15/635,483 dated Apr. 25, 2018.
Election/Restriction Requirement regarding U.S. Appl. No. 15/635,760 dated May 30, 2018.
Non-Final Office Action regarding U.S. Appl. No. 15/635,483 dated Aug. 1, 2018.
Non-Final Office Action regarding U.S. Appl. No. 15/635,760 dated Sep. 14, 2018.
U.S. Appl. No. 15/635,249, filed Jun. 28, 2017, Shawn W. Vehr et al.
U.S. Appl. No. 15/635,372, filed Jun. 28, 2017, Shawn W. Vehr et al.
U.S. Appl. No. 15/635,444, filed Jun. 28, 2017, Shawn W. Vehr et al.
U.S. Appl. No. 15/635,483, filed Jun. 28, 2017, Shawn W. Vehr et al.
U.S. Appl. No. 15/635,688, filed Jun. 28, 2017, Shawn W. Vehr et al.
U.S. Appl. No. 15/635,760, filed Jun. 28, 2017, Shawn W. Vehr et al.
U.S. Appl. No. 15/635,779, filed Jun. 28, 2017, Shawn W. Vehr et al.
U.S. Appl. No. 15/583,424, filed May 1, 2017, Kolpe.
U.S. Appl. No. 15/583,491, filed May 1, 2017, Devanawar et al.

(56) References Cited

OTHER PUBLICATIONS

Applicant-Initiated Interview Summary regarding U.S. Appl. No. 15/635,249 dated Dec. 28, 2018.
Applicant-Initiated Interview Summary regarding U.S. Appl. No. 15/635,760 dated Dec. 5, 2018.
Election/Restriction Requirement regarding U.S. Appl. No. 15/635,688, dated Dec. 6, 2018.
Han-2014: "A comparative study of commercial lithium ion battery cycle life in electrical vehicle: Aging mechanism identification", Xuebing Han et al., Journal of Power Sources 251 (2014) 38-54.
Non-Final Office Action regarding U.S. Appl. No. 15/635,372 dated Jan. 18, 2019.
Non-Final Office Action regarding U.S. Appl. No. 15/635,779 dated Dec. 26, 2018.
International Search Report regarding International Application No. PCT/US2017/040291, dated Sep. 21, 2017.
Written Opinion of the International Searching Authority regarding International Application No. PCT/US2017/040291, dated Sep. 21, 2017.
International Search Report regarding International Application No. PCT/US2017/040326, dated Sep. 21, 2017.
Written Opinion of the International Searching Authority regarding International Application No. PCT/US2017/040326, dated Sep. 21, 2017.
International Search Report regarding International Application No. PCT/US2017/040272, dated Sep. 22, 2017.
Written Opinion of the International Searching Authority regarding International Application No. PCT/US2017/040272, dated Sep. 22, 2017.
International Search Report regarding International Application No. PCT/US2017/040236, dated Oct. 16, 2017.
Written Opinion of the International Searching Authority regarding International Application No. PCT/US2017/040236, dated Oct. 16, 2017.
International Search Report regarding International Application No. PCT/US2017/040200, dated Oct. 16, 2017.
Written Opinion of the International Searching Authority regarding International Application No. PCT/US2017/040200, dated Oct. 16, 2017.
International Search Report regarding International Application No. PCT/US2017/040344, dated Oct. 18, 2017.
Written Opinion of the International Searching Authority regarding International Application No. PCT/US2017/040344, dated Oct. 18, 2017.
International Search Report regarding International Application No. PCT/US2017/040193, dated Oct. 30, 2017.
Written Opinion of the International Searching Authority regarding International Application No. PCT/US2017/040193, dated Oct. 30, 2017.
International Search Report regarding International Application No. PCT/US2017/040310, dated Oct. 30, 2017.
Written Opinion of the International Searching Authority regarding International Application No. PCT/US2017/040310, dated Oct. 30, 2017.
Applicant-Initiated Interview Summary regarding U.S. Appl. No. 15/635,483 dated Oct. 18, 2018.
Non-Final Office Action regarding U.S. Appl. No. 15/635,249 dated Dec. 3, 2018.

* cited by examiner

SYSTEM AND METHOD OF CONTROLLING AN OIL RETURN CYCLE FOR A REFRIGERATED CONTAINER OF A VEHICLE

CROSS-REFERENCE TO RELATED APPLICATIONS

This application claims the benefit of U.S. Provisional Application No. 62/356,608, filed Jun. 30, 2016. The entire disclosure of the application referenced above is incorporated herein by reference.

The entire disclosures of each of the following applications are incorporated herein by reference: U.S. Provisional Application No. 62/356,620, filed Jun. 30, 2016; U.S. Provisional Application No. 62/356,626, filed Jun. 30, 2016; U.S. Provisional Application No. 62/356,631, filed Jun. 30, 2016; U.S. Provisional Application No. 62/356,639, filed Jun. 30, 2016; U.S. Provisional Application No. 62/356,647, filed Jun. 30, 2016; U.S. Provisional Application No. 62/356,652, filed Jun. 30, 2016; and U.S. Provisional Application No. 62/356,666, filed Jun. 30, 2016.

FIELD

The present disclosure relates to vehicles and, more particularly, to refrigeration systems of vehicles.

BACKGROUND

Compressors may be used in a wide variety of industrial and residential applications to circulate refrigerant to provide a desired heating or cooling effect. For example, a compressor may be used to provide heating and/or cooling in a refrigeration system, a heat pump system, a heating, ventilation, and air conditioning (HVAC) system, or a chiller system. These types of systems can be fixed, such as at a building or residence, or can be mobile, such as in a vehicle. Vehicles include land based vehicles (e.g., trucks, cars, trains, etc.), water based vehicles (e.g., boats), air based vehicles (e.g., airplanes), and vehicles that operate over a combination of more than one of land, water, and air.

Small to mid-sized refrigerated truck systems can include one or more eutectic plates. The eutectic plates are disposed within a box of the corresponding truck and are used to maintain an air temperature within the box and thus contents of the box below a predetermined temperature. The eutectic plates are filled with a fluid and are designed to freeze at a certain temperature. The eutectic plates can be cooled to a medium temperature (e.g., 35° F.) or a low temperature (e.g., less than or equal to 0° F.). The refrigerated truck systems typically pull down a temperature of the eutectic plates at night while the truck is parked at a depot. The refrigerated truck systems typically do not run while the truck is in service (i.e. while standing at a site or while traveling between sites). The refrigerated truck systems do not maintain box set point temperatures accurately and therefore are typically used for transporting frozen goods, not fresh goods which require tighter temperature maintenance and set point tolerances.

Some refrigerated truck systems include, in addition to the eutectic plates, a blower/evaporator (hereinafter referred to as a "blower evaporator"). The blower evaporator is run as needed and to maintain a temperature within a box of the truck while the corresponding truck is in route between sites. Eutectic plate evaporators contain long refrigerant lines which provide large volume and surface area for oil logging to occur. When switching from the eutectic plate evaporator to the blower evaporator, the eutectic plates are closed off from the rest of the system. If the eutectic plates are closed off from the rest of the system when running the blower evaporator, any oil in the plates is trapped. Oil logging in the plates may cause reduction in compressor oil level which could potentially cause a failure.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In a feature, a refrigeration system of a vehicle is described. A compressor compresses a refrigerant. A eutectic plate cools a refrigerated space, and a mixture of the refrigerant and an oil flows through the eutectic plate to cool the eutectic plate. An evaporator cools the refrigerated space, and the mixture also flows through the evaporator. A control module controls the compressor, a first valve that permits or prevents flow of the mixture to the eutectic plate, and a second valve that permits or prevents flow of the mixture to the evaporator. In response to a temperature of the refrigerated space being greater than a predetermined temperature, the control module: increases a speed of the compressor; operates the compressor at the increased speed for a predetermined time period; after the predetermined period: opens the second valve to permit flow of the mixture to the evaporator and decrease the temperature of the refrigerated space; and closes the first valve to prevent flow of the mixture to the eutectic plate, where the control module opens the second valve before closing the first valve, and decreases the speed of the compressor after closing the first valve.

In further features, the control module: determines whether an engine of the vehicle is running based on input from an ignition sensor of the vehicle; and only increases the compressor speed when the engine is running.

In further features, the control module: determines whether an engine of the vehicle is running; determines whether the vehicle is connected to shore power; and increases the compressor speed when the engine is not running and the vehicle is connected to shore power.

In further features, the control module: determines the temperature of the refrigerated space based on measurements from a box temperature sensor; and compares the temperature of the refrigerated space with the predetermined temperature.

In further features, the predetermined temperature is a predetermined amount greater than a predetermined refrigerated space temperature.

In further features, the predetermined period is calibrated to allow oil in the refrigeration system to return to the compressor.

In further features, the predetermined period is five minutes.

In further features, the control module increases the compressor speed to within a range of 4000 to 4500 revolutions per minute (rpm), such as increasing the compressor speed from 4000 rpm to 4500 rpm.

In further features, the control module reduces the speed of the compressor to 1800 revolutions per minute (rpm).

In further features: the control module increases the compressor speed to within a range of 4000 to 4500 revolutions per minute (rpm), and a mass flow rate of the mixture at the increased speed is 250 pounds per hour (lb/hr); and the control module reduces the speed of the compressor to 1800 rpm, and a mass flow rate of the mixture when the speed of the compressor is reduced is 75 lb/hr.

In a feature, a method for controlling an oil return cycle for a refrigerated container of a vehicle is described. The method includes: determining whether to change a flow of a mixture of a refrigerant and an oil from a eutectic plate to an evaporator based on a temperature of the refrigerated container being greater than a predetermined temperature; in response to the temperature of the refrigerated container being greater than the predetermined temperature, increasing an operating speed of a compressor of a refrigeration system; operating the compressor at the increased operating speed for a predetermined period to change the flow of the mixture; opening a first valve to permit the mixture to flow to the eutectic plate during the predetermined period; after the predetermined period: opening a second valve to permit the mixture to flow to the evaporator to decrease a temperature of the refrigerated container; and closing the first valve to prevent the mixture to flow to the eutectic plate after opening the second valve, where the opening the second valve includes opening the second valve before the closing of the first valve; and reducing the operating speed of the compressor after the closing of the first valve.

In further features, the method further includes: determining whether an engine of the vehicle is running, where the increasing the operating speed of the compressor includes increasing the operating speed of the compressor only when the engine is running.

In further features, the method further includes: determining whether an engine of the vehicle is running; and determining whether the vehicle is connected to shore power, wherein the increasing the operating speed of the compressor includes increasing the compressor speed when the engine is not running and the vehicle is connected to shore power.

In further features, the predetermined temperature is a predetermined amount greater than a predetermined refrigerated space temperature.

In further features, the predetermined period is calibrated to allow oil in the refrigeration system to return to the compressor.

In further features, the predetermined period is five minutes.

In further features, the increasing the operating speed of the compressor includes increasing the operating speed of the compressor to a range of 4000 to 4500 revolutions per minute (rpm), such as from 4000 rpm to 4500 rpm In further features, the reducing the operating speed of the compressor includes reducing the operating speed of the compressor to 1800 revolutions per minute (rpm).

In further features: the increasing the operating speed of the compressor includes increasing the operating speed of the compressor to a range of 4000 to 4500 revolutions per minute (rpm); a mass flow rate of the mixture at the increased operating speed is 250 pounds per hour (lb/hr); the reducing the operating speed of the compressor includes reducing the operating speed of the compressor to 1800 rpm; and a mass flow rate of the mixture when the operating speed of the compressor is reduced is 75 lb/hr.

In further features, the closing the first valve includes closing the first valve within a range of one to two seconds after the opening of the second valve.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

The examples disclosed herein include a system and method for control utilizing a variable speed compressor to reduce the amount of oil or refrigerant logged in a eutectic plate evaporator. Speeds of the compressor may be switched between a finite set of predetermined speeds or may be set at any number of speeds within respective predetermined ranges. In one embodiment, the amount of refrigerant logged in the eutectic plate evaporator may be reduced by utilizing the ability of a variable speed scroll in the compressor to adjust a mass flow of the system and by using a control module to open and close solenoid valves on command.

The example operation occurs when switching from use of the eutectic plate evaporator to the blower evaporator. When switching to the blower evaporator, the control module commands the compressor to a higher speed to drive refrigerant out of the eutectic plates and back to the compressor. After a predetermined sufficient run time, the control module opens a valve to the active blower evaporator and immediately closes a valve to the eutectic plates. This operation ensures a minimum amount of refrigerant is logged in the eutectic plates and the refrigerant level in the compressor is maintained at a safe level.

Figure 1A:
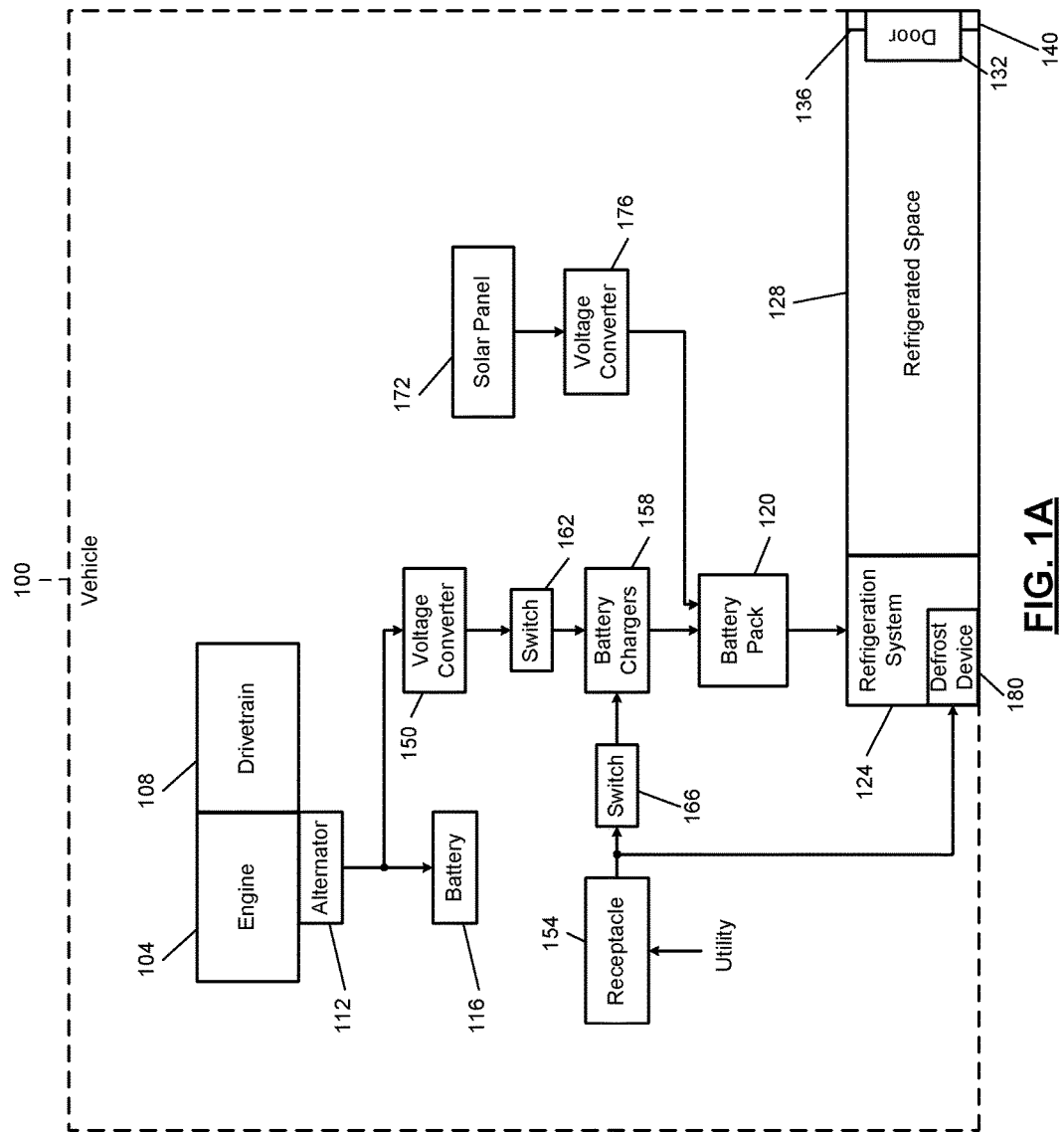
FIGS. 1A and 1B are functional block diagrams of example vehicle systems.
Figure 1B:
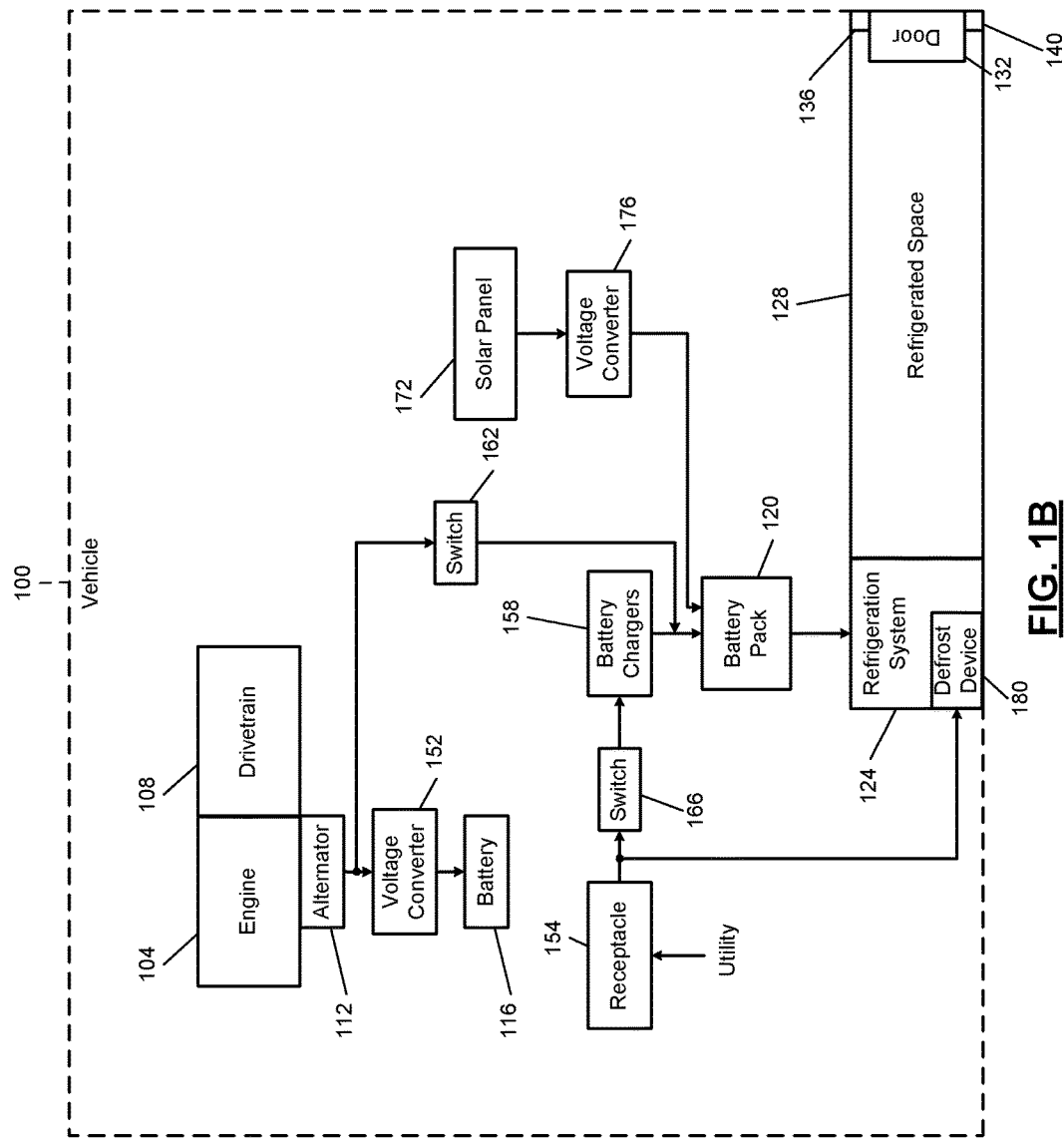

FIGS. 1A and 1B are functional block diagrams of example systems of a vehicle 100. The vehicle 100 includes an internal combustion engine 104 that combusts air and fuel within cylinders to generate propulsion torque for the vehicle 100. The engine 104 may combust, for example, gasoline, diesel fuel, natural gas, and/or one or more other types of fuel. The engine 104 outputs torque to a drivetrain 108. The drivetrain 108 transfers torque to two or more wheels of the vehicle. While the example of a wheeled vehicle is provided, the present application is not limited to vehicles having wheels and is also applicable to water and/or air based vehicles.

An electrical source 112 is driven by the engine 104 and converts mechanical energy of the engine 104 into electrical energy to charge a battery 116. The electrical source 112 may include an alternator, a generator, and/or another type of device that converts mechanical energy of the engine 104 into electrical energy. While the example of a single electrical source is provided, multiple or zero electrical sources driven by the engine 104 may be included. The electrical source 112 may be, for example, a 12 V alternator (e.g., in the example of FIG. 1A) and/or a 48 V alternator (e.g., in the example of FIG. 1B).

The vehicle 100 also includes a battery pack 120. For example only, the battery pack 120 may be a 48 Volt (V) direct current (DC) battery pack, although another suitable battery pack may be used. The battery pack 120 may include two or more individual batteries connected together or may include one battery. For example, in the case of a 48 V battery pack, the battery pack 120 may include four 12 V batteries connected in series. The batteries may be connected such that a lower voltage, such as 12 V, 24 V, and/or 36 V can also be obtained from one, two, or three of the batteries.

Figure 2A:
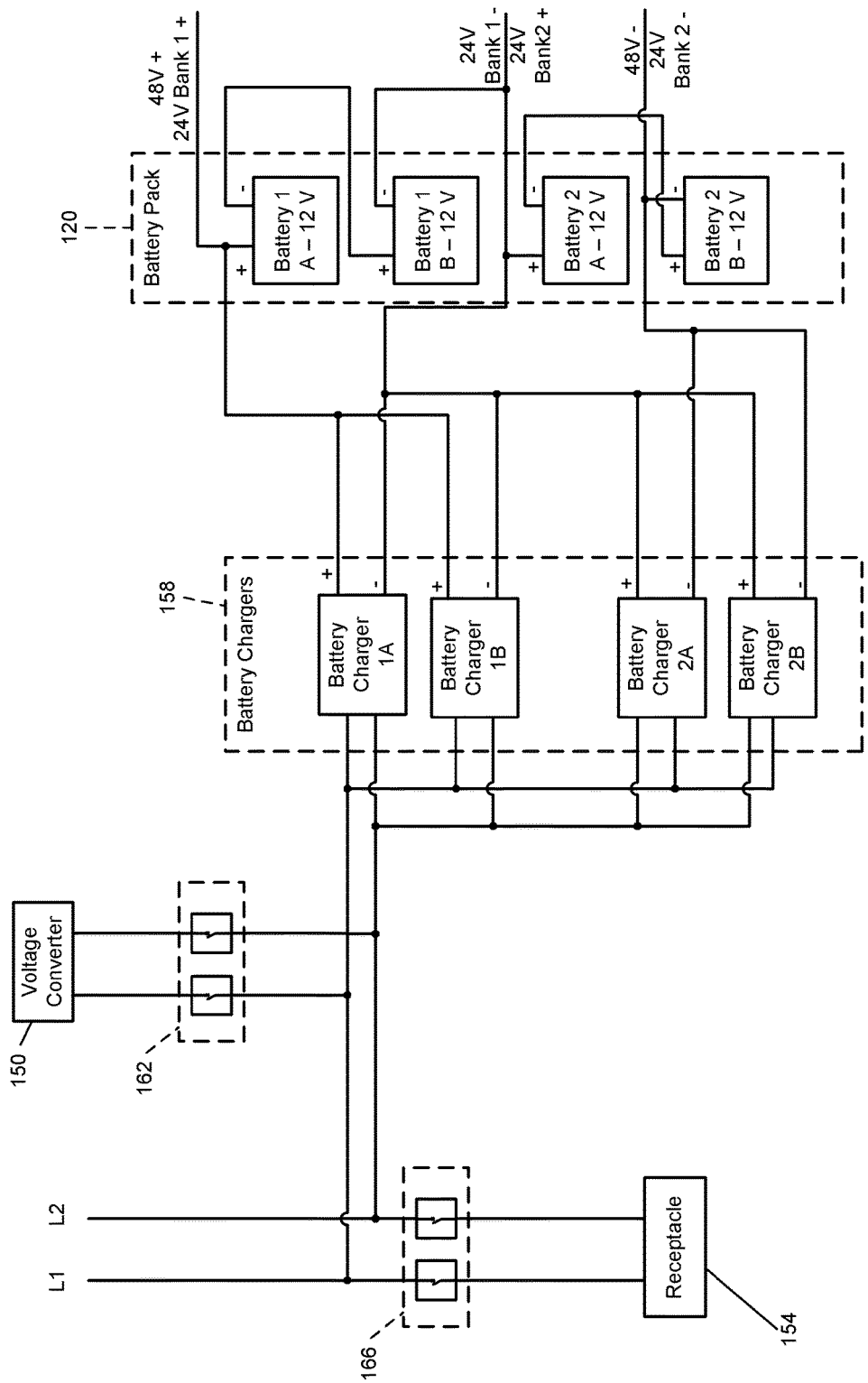
FIGS. 2A and 2B are schematics including a battery pack for a refrigeration system of a vehicle and example charging systems for charging the battery pack.
Figure 2B:
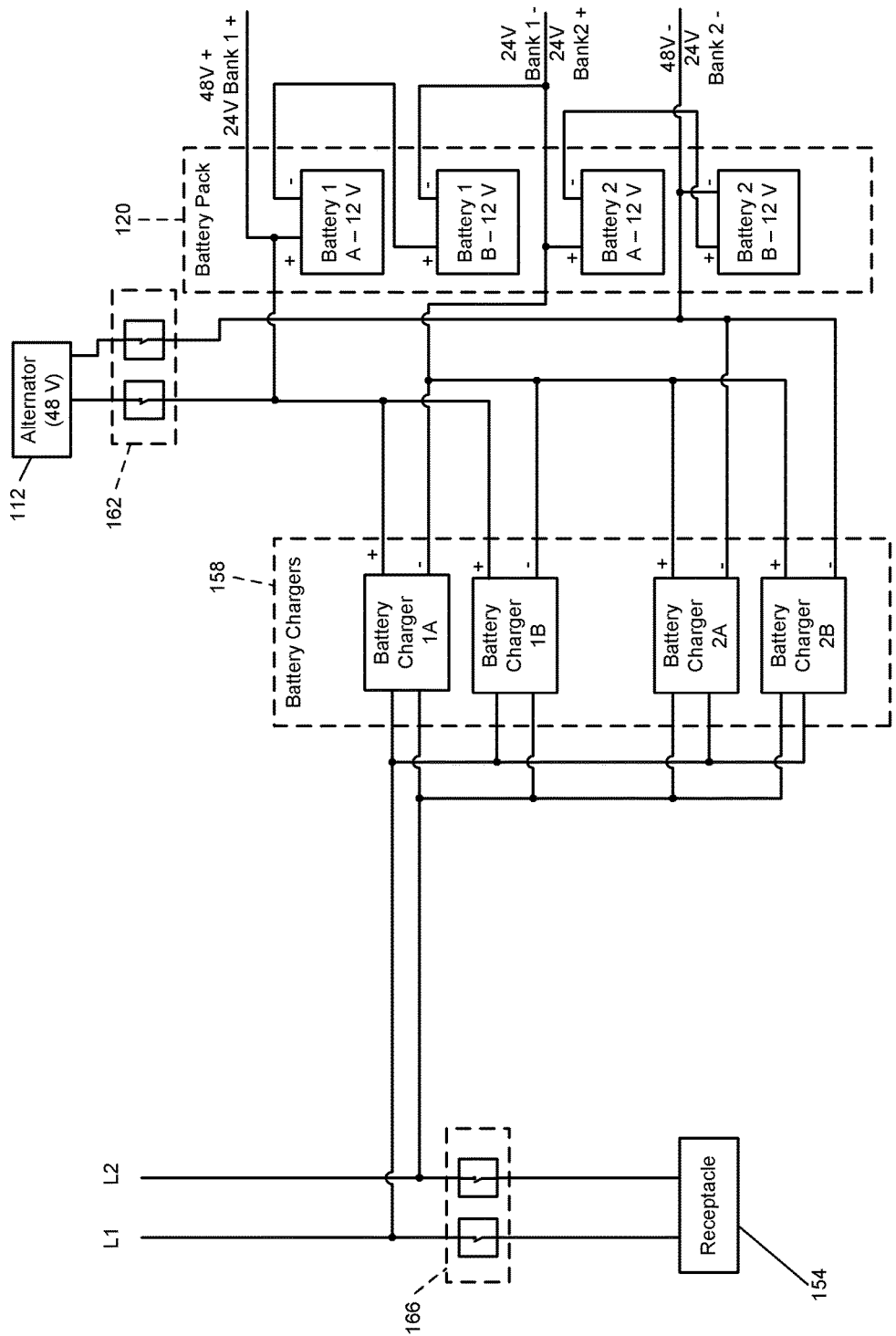

FIGS. 2A and 2B are schematics including examples of the battery pack 120 for a refrigeration system of a vehicle and example charging systems. In the examples of FIGS. 2A and 2B, the battery pack 120 includes four individual 12 V batteries connected in series. The batteries are arranged in two banks (A and B), each bank having two individual 12 V batteries (batteries 1 and 2) connected in series, to provide two 24 V reference potentials.

Referring back to FIGS. 1A and 1B, the battery pack 120 supplies power to a refrigeration system 124. The refrigeration system 124 cools a refrigerated space 128. The refrigerated space 128 may be one refrigerated space that is cooled based on a setpoint temperature. Alternatively, the refrigerated space 128 may be divided (e.g., physically) into multiple refrigerated spaces that may be cooled based on respective setpoint temperatures. For example, a first portion of the refrigerated space 128 may be cooled based on a first setpoint temperature (e.g., for refrigerated items) and a second portion of the refrigerated space 128 may be cooled based on a second setpoint temperature (e.g., for frozen items) that is less than the first setpoint temperature. One example of such a vehicle includes a truck for transporting perishable food items between locations. The refrigerated space(s) may be cooled with a closed loop control system based on temperature(s) within the refrigerated space(s) and the set point temperature(s), respectively.

The vehicle 100 includes a door 132 that provides access to the refrigerated space 128, for example, for loading and unloading of contents of the refrigerated space 128. While the example of one door is provided, the vehicle 100 may include two or more doors. Some vehicles include fourteen (14) or more doors.

An unlock actuator 136 and a lock actuator 140 may unlock and lock the door 132, respectively. The unlock and lock actuators 136 and 140 may, for example, slide a pin out of and into a receiver to lock and unlock the door 132, respectively. An unlock actuator and a lock actuator may be provided with each door to the refrigerated space in various implementations.

A control module (discussed further below) of the refrigeration system 124 may actuate the unlock actuator 136 to unlock the door 132 (and the other doors to the refrigerated space 128) in response to user input to unlock doors of a passenger cabin of the vehicle 100. The control module may actuate the lock actuator 140 to lock the door 132 (and the other doors to the refrigerated space 128) in response to user input to lock the doors of the passenger cabin of the vehicle 100. User input to lock and unlock the doors of the passenger cabin may be provided, for example, via a wireless key fob, a mobile device (e.g., cell phone, tablet, or other handheld device), a remote computer system, and/or one or more lock/unlock switches accessible from within the passenger cabin of the vehicle 100.

The battery pack 120 can be charged using multiple different power sources. For example, in the example of FIG. 1A, the vehicle 100 includes a voltage converter 150 that converts power output by the electrical source 112 (e.g., 12 V) into power for charging the battery pack 120. The voltage converter 150 may convert the DC output of the electrical source 112 into, for example, 240 V alternating current (AC). Since the electrical source 112 is driven by rotation of the engine 104, the electrical source 112 may be used to charge the battery pack 120 when the engine 104 is running.

While the electrical source 112 is shown as providing power for charging both the battery 116 and the battery pack 120, a second electrical source may be used to convert power of the engine 104 into electrical power for the battery pack 120. In that case, the electrical source 112 may be used to charge the battery 116. In various implementations, the voltage converter 150 and a switch 162 may be omitted, and the engine 104 may not be used to charge the battery pack 120. The battery pack 120 may instead be charged via one or more other power sources, such as those discussed further below.

As another example, in the example of FIG. 1B, the electrical source 112 may charge the battery pack 120. In this example, a voltage converter 152 may convert the power output by the electrical source 112 (e.g., 48 V) into power for charging the battery 116. The voltage converter 152 may convert the DC output of the electrical source 112 into, for example, 12 V for the battery 116. Alternatively, however, another electrical source may be used to charge the battery 116. In various implementations, an (engine driven) electrical source for charging the battery pack 120 may be omitted.

The battery pack 120 can be charged using power from a utility received via a receptacle 154. The receptacle 154 is configured to receive AC or DC power. For example, the receptacle 154 may receive AC power from a utility via a power cord (e.g., an extension cord) connected between the receptacle 154 and a wall outlet or charger of a building. The receptacle 154 may be, for example, a single phase 110/120 or 208/240 V AC receptacle or a 3-phase 208/240 V AC receptacle. In various implementations, the vehicle 100 may include both a 110/120 V AC receptacle and a 208/240 V AC receptacle. While the example of the receptacle 154 receiving AC power is provided, the receptacle 154 may alternatively receive DC power from via a power cord. In various implementations, the vehicle 100 may include one or more AC receptacles and/or one or more DC receptacles. Power received from a utility via the receptacle 154 will be referred to as shore power.

The vehicle 100 also includes one or more battery chargers 158. The battery chargers 158 charge the batteries of the battery pack 120 using shore power received via the receptacle 154 (or power output by the voltage converter 150 in the examples of FIGS. 1A and 2A). When the receptacle 154 is connected to shore power, the switch 162 opens (or is opened) to isolate power from the electrical source 112. While the switch 162 is shown illustratively as one switch, the switch 162 may include one, two, or more than two switching devices (e.g., normally closed or normally open relays). In the examples of FIGS. 2A and 2B, the switch 162 is illustrated as including two relays, one relay for each power line.

When the receptacle 154 is connected to shore power and the ignition system of the vehicle 100 is OFF, a switch 166 closes (or is closed) to relay power from the receptacle 154 to the battery chargers 158, and the battery chargers 158 charge the batteries using shore power. While the switch 166 is also shown illustratively as one switch, the switch 166 may include one, two, or more than two switching devices (e.g., normally closed or normally open relays). In the example of FIGS. 2A and 2B, the switch 166 is illustrated as including two relays, one relay for each power line.

When the ignition system of the vehicle 100 is ON, the switch 166 isolates the receptacle 154 from the battery chargers 158. In the examples of FIGS. 1A and 2A, when the ignition system of the vehicle 100 is ON (such that the engine 104 is running and the voltage converter 150 is outputting power to charge the battery pack 120), the switch 162 connects the voltage converter 150 to the battery chargers 158. The battery chargers 158 can then charge the batteries of the battery pack 120 using power output by the voltage converter 150. In the examples of FIGS. 1B and 2B, when the ignition system of the vehicle 100 is ON (such that the engine 104 is running and the electrical source 112 is outputting power), the switch 162 connects the electrical source 112 to the battery pack 120 so the electrical source 112 charges the battery pack 120.

One battery charger may be provided for each battery of the battery pack 120. Two or more battery chargers may be connected in series and/or parallel in various implementations. Each battery charger may convert input power (e.g., shore power or power output by the voltage converter 150) into, for example, 24 V, 40 amp (A) DC power for charging. For example only, the battery chargers 158 may include one model SEC-2440 charger, manufactured by Samlex America Inc., of Burnaby, BC, Canada. In the examples of FIGS. 2A and 2B, two groups of two 24 V, 40 A battery chargers are connected to provide a 48 V, 80 A output for battery charging. While the example of battery chargers having a 24 V, 40 A output is provided, battery chargers having another output may be used, such as one 12 V charger connected to each battery. The battery chargers 158 may also monitor the individual batteries and control application of power to the respective batteries to prevent overcharging.

The vehicle 100 may optionally include a solar panel 172. The solar panel 172 converts solar energy into electrical energy. While the example of one solar panel is provided, multiple solar panels may be used. A voltage converter 176 converts power output by the solar panel 172 and charges the battery pack 120.

As discussed further below, the refrigeration system 124 includes one or more eutectic plates. The eutectic plate(s) are cooled when the vehicle 100 is connected to shore power. When the vehicle 100 is later disconnected from shore power (e.g., for delivery of contents of the refrigerated space 128), the eutectic plate(s) can be used to cool the refrigerated space 128 via power from the battery pack 120. The eutectic plate(s) can also be cooled by the refrigeration system 124 when the vehicle 100 is disconnected from shore power.

By charging the battery pack 120 when the vehicle 100 is connected to shore power (and/or via the solar panel 172), use of the engine 104 to generate power to operate the refrigeration system 124 when the vehicle 100 is disconnected from shore power may be minimized or eliminated. This may decrease fuel consumption (and increase fuel efficiency) of the engine 104 and the vehicle 100.

A defrost device 180 may be used to defrost the eutectic plate(s) when the vehicle 100 is connected to shore power. One example of the defrost device 180 includes a resistive heater that warms air circulated over, around, and/or through the eutectic plate(s), such as by one or more fans. Another example of the defrost device 180 includes a resistive heater that warms a fluid (e.g., a glycol solution) that is circulated over, around, and/or through the eutectic plate(s), such as by one or more pumps. In this way, heat from the warm air or warm fluid defrosts the eutectic plate(s).

Figure 3:
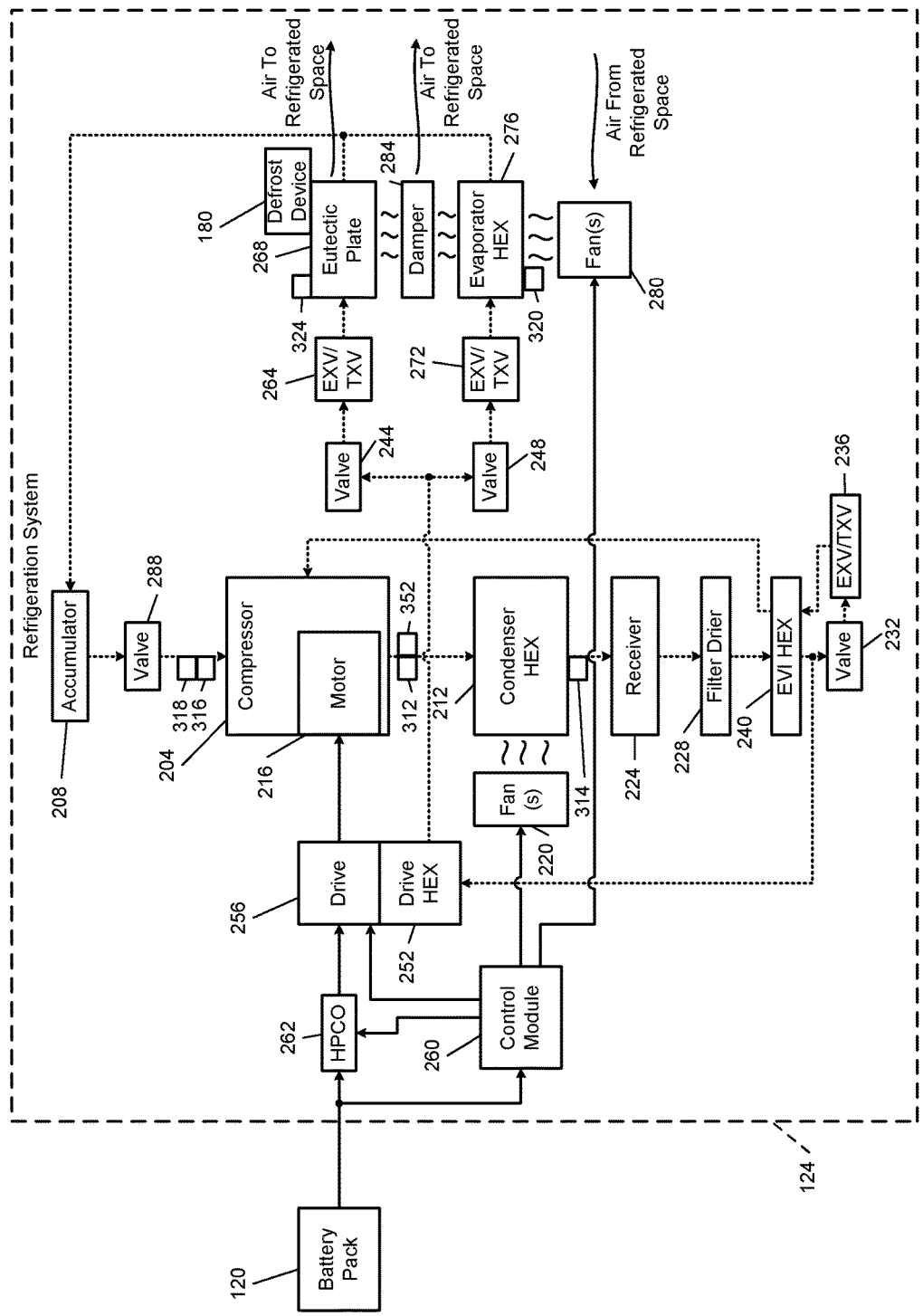
FIG. 3 is a functional block diagram of an example implementation of a refrigeration system of a vehicle including a eutectic plate and an evaporator system.

FIG. 3 includes a functional block diagram of an example implementation of the refrigeration system 124. In the example of FIG. 3, dotted lines indicate refrigerant flow, while solid lines indicate electrical connections. In various implementations, some, all, or none of the components of the refrigeration system 124 may be located within the refrigerated space 128.

A compressor 204 receives refrigerant vapor from an accumulator 208 via a suction line of the compressor 204. The accumulator 208 collects liquid refrigerant to minimize liquid refrigerant flow to the compressor 204. The compressor 204 compresses the refrigerant and provides pressurized refrigerant in vapor form to a condenser heat exchanger (HEX) 212. The compressor 204 includes an electric motor 216 that drives a pump to compress the refrigerant. For example only, the compressor 204 may include a scroll compressor, a reciprocating compressor, or another type of refrigerant compressor. The electric motor 216 may include, for example, an induction motor, a permanent magnet motor (brushed or brushless), or another suitable type of electric motor. In various implementations, the electric motor 216 may be a brushless permanent magnet (BPM) motor, for example, due to BPM motors being more efficient than other types of electric motors.

All or a portion of the pressurized refrigerant is converted into liquid form within the condenser HEX 212. The condenser HEX 212 transfers heat away from the refrigerant, thereby cooling the refrigerant. When the refrigerant vapor is cooled to a temperature that is less than a saturation temperature of the refrigerant, the refrigerant transitions into liquid (or liquefied) form. One or more condenser fans 220 may be implemented to increase airflow over, around, and/or through the condenser HEX 212 and increase the rate of heat transfer away from the refrigerant.

Refrigerant from the condenser HEX 212 is delivered to a receiver 224. The receiver 224 may be implemented to store excess refrigerant. In various implementations, the receiver 224 may be omitted. A filter drier 228 may be implemented to remove moister and debris from the refrigerant. In various implementations, the filter drier 228 may be omitted.

When an enhanced vapor injection (EVI) valve 232 is open, a portion of the refrigerant may be expanded to vapor form by an expansion valve 236 and provided to an EVI HEX 240. The EVI valve 232 may be, for example, a solenoid valve or another suitable type of valve.

The EVI HEX 240 may be a counter flow plate HEX and may superheat the vapor refrigerant from the EVI valve 232. Vapor refrigerant from the EVI HEX 240 may be provided to the compressor 204, such as at a midpoint within a compression chamber of the compressor 204. EVI may be performed, for example, to increase capacity and increase efficiency of the refrigeration system 124. The EVI valve 232 may include a thermostatic expansion valve (TXV) or an electronic expansion valve (EXV).

The refrigerant not flowing through the EVI valve 232 is circulated to a plate control valve 244 and an evaporator control valve 248. The plate control valve 244 may be, for example, a solenoid valve or another suitable type of valve. The evaporator control valve 248 may be, for example, a solenoid valve or another suitable type of valve.

Before flowing to the plate control valve 244 and the evaporator control valve 248, the refrigerant may flow through a drive HEX 252. The drive HEX 252 draws heat away from a drive 256 and transfers heat to refrigerant flowing through the drive HEX 252. While the example of the drive HEX 252 being liquid (refrigerant) cooled is provided, the drive 256 may additionally or alternatively be air cooled. Air cooling may be active (e.g., by a fan) or passive (e.g., by conduction and convection).

The drive 256 controls application of power to the motor 216 from the battery pack 120. For example, the drive 256 may control application of power to the motor 216 based on a speed command from a control module 260. Based on the speed command, the drive 256 may generate three-phase AC power (e.g., 208/240 V AC) and apply the three-phase AC power to the motor 216. The drive 256 may set one or more characteristics of the three-phase AC power based on the speed command, such as frequency, voltage, and/or current. For example only, the drive 256 may be a variable frequency drive (VFD). In various implementations, one or more electromagnetic interference (EMI) filters may be implemented between the battery pack 120 and the drive 256.

The control module 260 may set the speed command to a plurality of different possible speeds for variable speed operation of the motor 216 and the compressor 204. The control module 260 and the drive 256 may communicate, for example, using RS485 Modbus or another suitable type of communication including, but not limited to, controller area network (CAN) bus or analog signaling (e.g., 0-10V signals).

A high pressure cut off (HPCO) 262 may be implemented to disconnect the drive 256 from power and disable the motor 216 when the pressure of refrigerant output by the compressor 204 exceeds a predetermined pressure. The control module 260 may also control operation of the compressor 204 based on a comparison of the pressure of refrigerant output by the compressor 204. For example, the control module 260 may shut down or reduce the speed of the compressor 204 when the pressure of refrigerant output by the compressor is less than a second predetermined pressure that is less than or equal to the predetermined pressure used by the HPCO 262.

When the plate control valve 244 is open, refrigerant may be expanded to vapor form by an expansion valve 264 and provided to a eutectic plate 268. The vapor refrigerant cools the eutectic plate 268 and a solution within the eutectic plate 268. For example only, the solution may be a solution including one or more salts. The solution may have a freezing point temperature of, for example, approximately 12 degrees Fahrenheit or another suitable freezing point temperature. The solution of the eutectic plate 268 may be selected, for example, based on the items typically cooled within the refrigerated space 128. The expansion valve 264 may include a TXV or may be an EXV.

The eutectic plate 268 is located within the refrigerated space 128 and cools the refrigerated space 128. By freezing the solution within the eutectic plate 268, the eutectic plate 268 can be used to cool the refrigerated space for a period of time after the freezing, such as while the vehicle 100 is transporting items within the refrigerated space 128.

When the evaporator control valve 248 is open, refrigerant may be expanded to vapor form by an expansion valve 272 and provided to an evaporator HEX 276. The expansion valve 272 may include a TXV or may be an EXV. Like the eutectic plate 268, the evaporator HEX 276 cools the refrigerated space 128. More specifically, the vapor refrigerant within the evaporator HEX 276 transfers heat away (i.e., absorbs heat) from air within the refrigerated space 128.

One or more evaporator fans 280 may draw air from the refrigerated space 128. The evaporator fan(s) 280 may increase airflow over, around, and/or through the evaporator HEX 276 and the eutectic plate 268 to increase the rate of heat transfer away from (i.e., cooling of) the air within the refrigerated space 128. A damper door 284 may be implemented to allow or block airflow from the evaporator fan(s) 280 to the eutectic plate 268. For example, when the damper door 284 is open, the evaporator fan(s) 280 may circulate air past the evaporator HEX 276 and the eutectic plate 268. When the damper door 284 is closed, the damper door 284 may block airflow from the evaporator fan(s) 280 to the eutectic plate 268, and the evaporator fan(s) 280 may circulate air over, around, and/or through the evaporator HEX 276. While the example of the damper door 284 is provided, another suitable actuator may be used to allow/prevent airflow from the evaporator fan(s) 280 to the eutectic plate 268. Alternatively, one or more fans may be provided with the evaporator HEX 276, and one or more fans may be provided with the eutectic plate 268. Refrigerant flowing out of the eutectic plate 268 and the evaporator HEX 276 may flow back to the accumulator 208. Air cooled by the evaporator HEX 276 and the eutectic plate 268 flows to the refrigerated space to cool the refrigerated space 128. While separate cooled air paths are illustrated in the example of FIG. 3, air flowing out of the eutectic plate 268 may be combined with air flowing out of the evaporator HEX 276 before the cooled air is output to cool the refrigerated space 128. Curved lines in FIG. 3 are illustrative of air flow.

The refrigeration system 124 may also include a compressor pressure regulator (CPR) valve 288 that regulates pressure of refrigerant input to the compressor 204 via the suction line. For example, the CPR valve 288 may be closed to limit pressure into the compressor 204 during startup of the compressor 204. The CPR valve 288 may be an electronically controlled valve (e.g., a stepper motor or solenoid valve), a mechanical valve, or another suitable type of valve. In various implementations, the CPR valve 288 may be omitted.

Figure 4A:
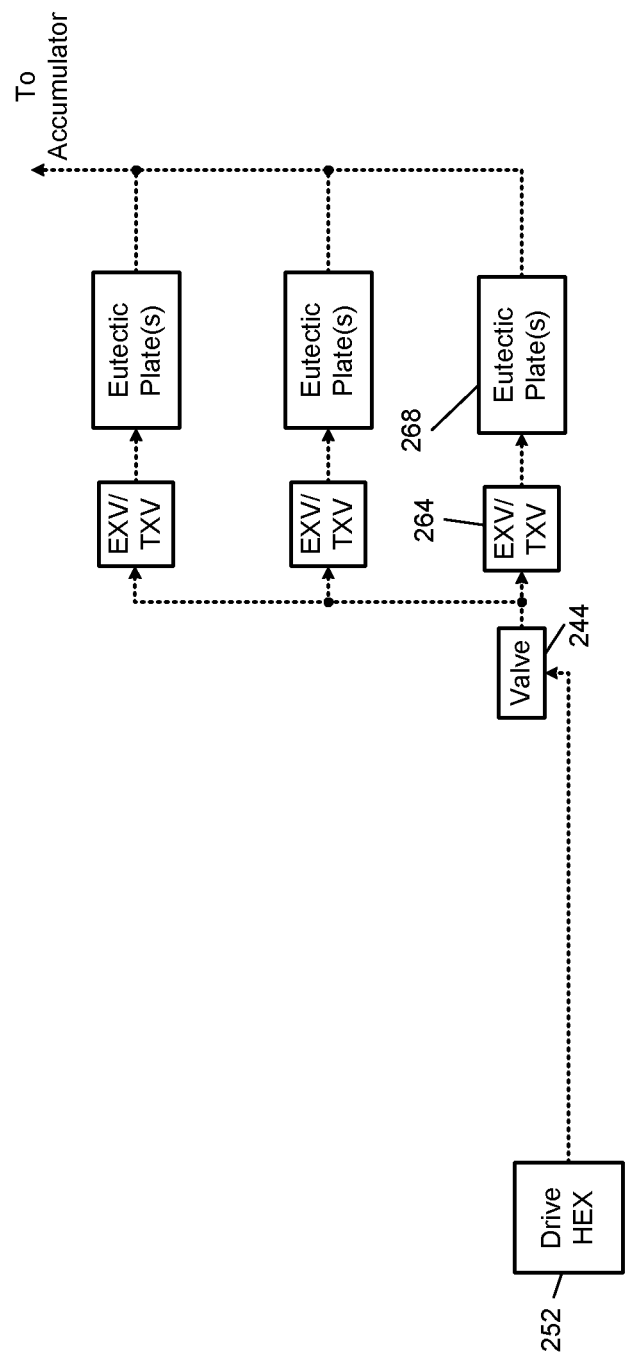
FIG. 4A includes a functional block diagram of a portion of an example refrigeration system including multiple eutectic plates.

The example of one eutectic plate and one evaporator HEX is provided in FIG. 3. However, the refrigeration system 124 may include more than one eutectic plate, such as two, three, four, five, six, or more eutectic plates. One expansion valve may be provided for each eutectic plate. FIG. 4A includes a functional block diagram of a portion of an example refrigeration system including multiple eutectic plates.

Figure 4B:
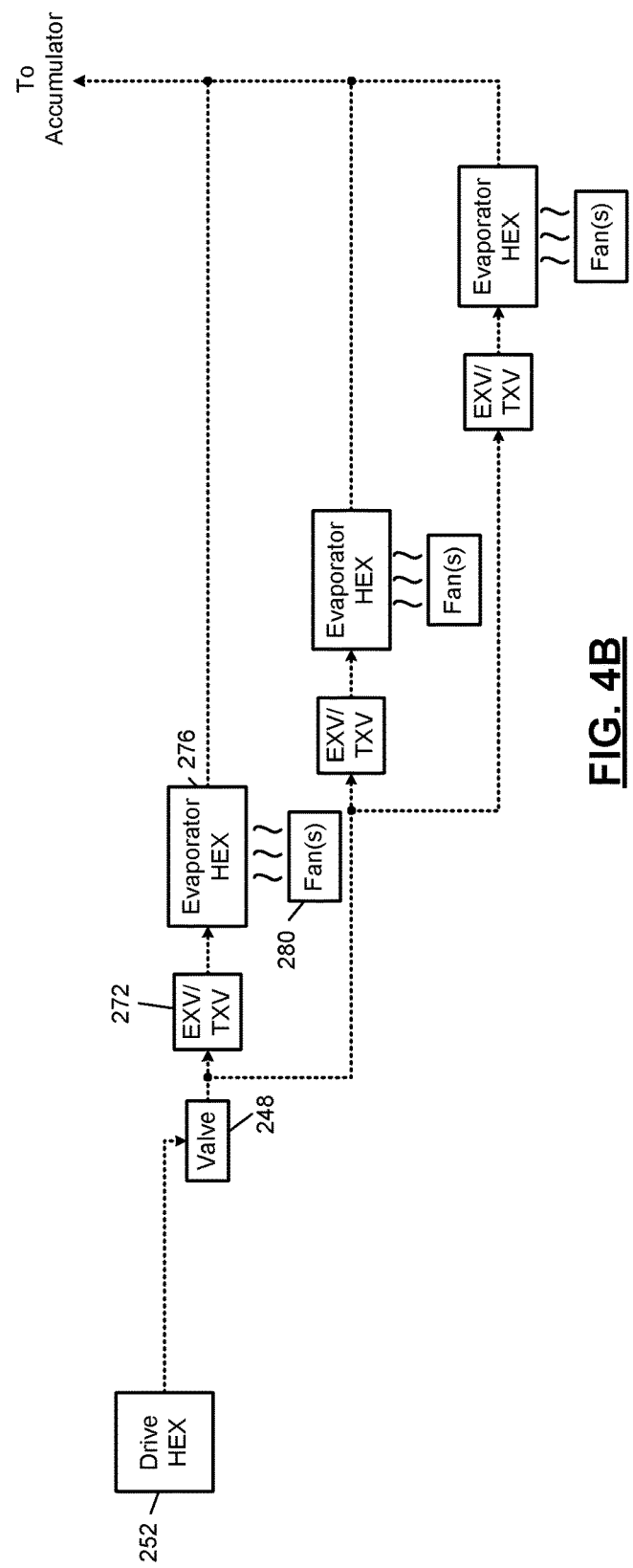
FIG. 4B includes a functional block diagram of a portion of an example refrigeration system including multiple evaporator systems.

Additionally or alternatively to having one or multiple eutectic plates, the refrigeration system 124 may include more than one evaporator HEX, such as two, three, four, five, six, or more evaporator HEXs. For example, different evaporator HEXs may be provided for different sections of the refrigerated space 128. One expansion valve and one or more evaporator fans may be provided for each evaporator HEX. FIG. 4B includes a functional block diagram of a portion of an example refrigeration system including three evaporator HEXes.

Some vehicles may include two or more refrigerated spaces, but only include an evaporator (or multiple) and a eutectic plate (or multiple) in one of the refrigerated spaces. A damper door or another suitable actuator may be provided to open and close the one refrigerated space having the evaporator and eutectic plate to and from one or more other refrigerated spaces not having an evaporator or a eutectic plate (i.e., not having any evaporators and not having any eutectic plates). The control module 260 may control opening and closing of such a damper door or actuator, for example, based on maintaining a temperature within the other refrigerated space based on a setpoint for that other refrigerated space.

Figure 5:
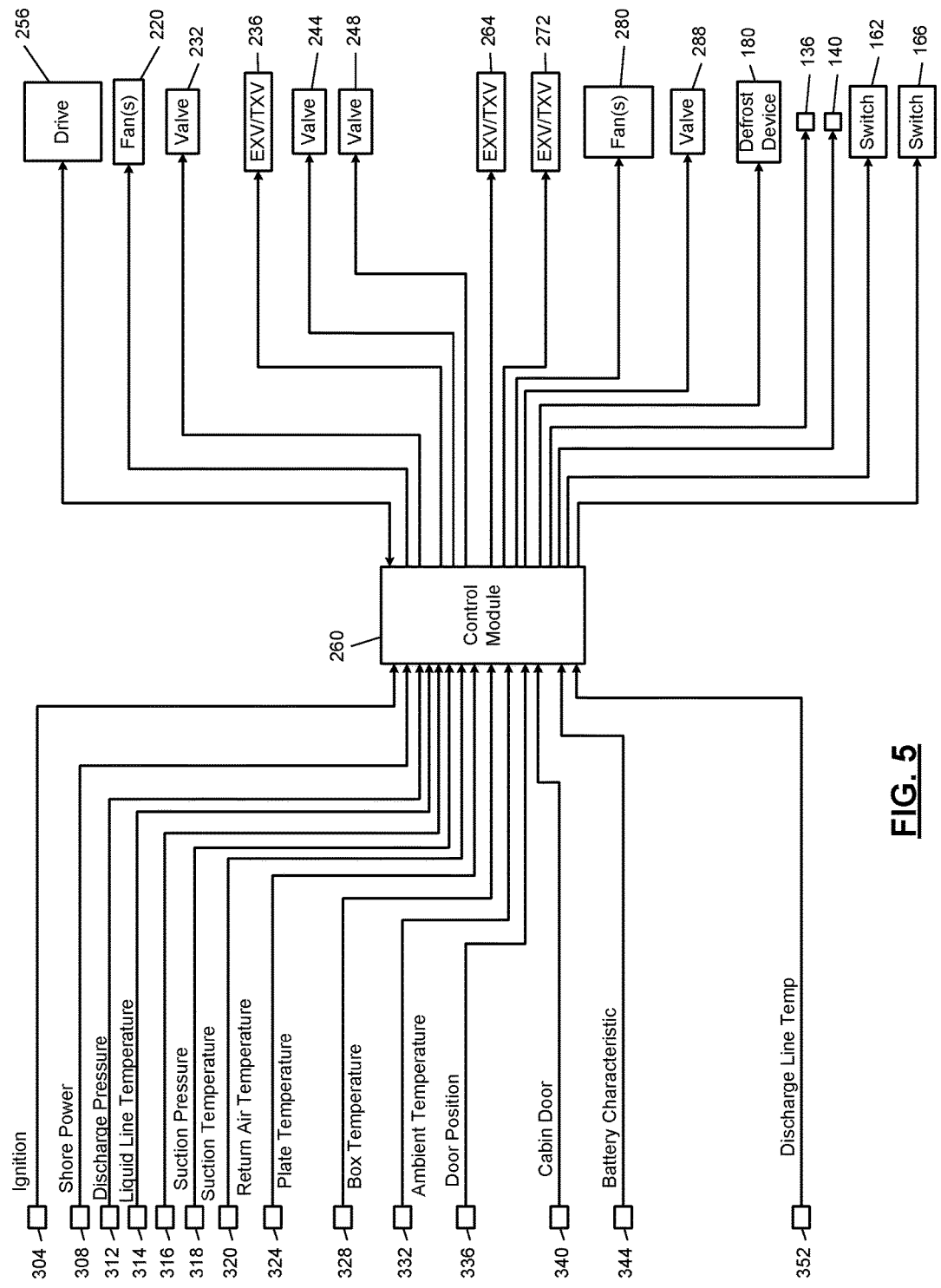
FIG. 5 includes a functional block diagram of an example system including a control module, sensors of the vehicle, and actuators of the vehicle.

FIG. 5 includes a functional block diagram of an example system including the control module 260, various sensors of the vehicle 100, and various actuators of the vehicle 100. The control module 260 receives various measured parameters and indications from sensors of the vehicle 100. The control module 260 controls actuators of the vehicle 100. As an example, the control module 260 may be an iPRO series control module (e.g., 100 series, 200 series, 4 DIN series, 10 DIN series) by Dixell S.r.l., located in Pieve d'Alpago (BL) Italy. One example is an iPRO IPG115D control module, however, the control module 260 may be another suitable type of control module.

An ignition sensor 304 indicates whether an ignition system of the vehicle 100 is ON or OFF. A driver may turn the ignition system of the vehicle 100 ON and start the engine 104, for example, by actuating an ignition key, button, or switch. The ignition system being ON may indicate that that a refrigeration system (discussed further below) is being or can be powered via a charging system powered by the engine 104. A driver may turn the ignition system of the vehicle 100 OFF and shut down the engine 104, for example, by actuating the ignition key, button, or switch.

A shore power sensor 308 indicates whether the vehicle 100 is receiving shore power via the receptacle 154.

A discharge pressure sensor 312 measures a pressure of refrigerant output by the compressor 204 (e.g., in the discharge line). The pressure of refrigerant output by the compressor 204 can be referred to as discharge pressure.

A liquid line temperature sensor 314 measures a temperature of liquid refrigerant output from the condenser HEX 212 (e.g., in the liquid line). The temperature of refrigerant output by the condenser HEX 212 can be referred to as liquid line temperature. The control module 260 may determine a subcooling value based on the liquid line temperature. The control module may determine a refrigerant charge level based on the subcooling value. While one example location of the liquid line temperature sensor 314 is shown, the liquid line temperature sensor 314 may be located at another location where liquid refrigerant is present in the refrigerant path from the condenser HEX 212 to the evaporator HEX 276 (and the eutectic plate 268).

A suction pressure sensor 316 measures a pressure of refrigerant input to the compressor 204 (e.g., in the suction line). The pressure of refrigerant input to the compressor 204 can be referred to as suction pressure.

A suction temperature sensor 318 measures a temperature of refrigerant input to the compressor 204 (e.g., in the suction line). The temperature of refrigerant input to the compressor 204 can be referred to as suction temperature. The control module 260 may determine a superheat value at the compressor 204. The control module 260 may detect and/or predict the presence of a liquid floodback condition based on the superheat value.

A return air temperature sensor 320 measures a temperature of air input to the evaporator HEX 276. The temperature of air input to the evaporator HEX 276 can be referred to as return air temperature (RAT). One return air temperature sensor may be provided for each set of one or more evaporator HEX and one or more eutectic plates.

A plate temperature sensor 324 measures a temperature of the eutectic plate 268. The temperature of the eutectic plate 268 can be referred to as a plate temperature.

A box temperature sensor 328 measures a temperature within the refrigerated space 128. The temperature within the refrigerated space 128 can be referred to as a box temperature. One or more box temperature sensors may be provided and measure a box temperature within each different portion of the refrigerated space 128.

An ambient temperature sensor 332 measures a temperature of ambient air at the location of the vehicle 100. This temperature can be referred to as ambient air temperature. In various implementations, the control module 260 may receive the ambient air temperature from an engine control module (ECM) that controls actuators of the engine 104.

A door position sensor 336 indicates whether the door 132 is closed or open. An indication that the door 132 is open may mean that the door 132 is at least partially open (i.e., not closed), while an indication that the door 132 is closed may mean that the door 132 is fully closed. One or more door position sensors may be provided for each door to the refrigerated space 128.

A cabin door sensor 340 indicates whether the doors of the passenger cabin have been commanded to be locked or unlocked. A driver may command unlocking and locking of the doors of the passenger cabin, for example, via a wireless key fob. As discussed above, the control module 260 may actuate the unlock actuator 136 to unlock the door(s) to the refrigerated space 128 when the driver commands unlocking of the doors passenger cabin. The control module 260 may actuate the lock actuator 140 to lock the door(s) to the refrigerated space 128 when the driver commands locking of the doors of the passenger cabin.

A battery sensor 344 measures a characteristic of a battery of the battery pack 120, such as voltage, current, and/or temperature. In various implementations, a voltage sensor, a current sensor, and/or a temperature sensor may be provided with each battery of the battery pack 120.

A discharge line temperature sensor 352 measures a temperature of refrigerant output by the compressor 204 (e.g., in the discharge line). The temperature of refrigerant output by the compressor 204 can be referred to as discharge line temperature (DLT). In various implementations, the discharge line temperature sensor 352 may provide the DLT to the drive 256, and the drive 256 may communicate the DLT to the control module 260.

Sensors described herein may be analog sensors or digital sensors. In the case of an analog sensor, the analog signal generated by the sensor may be sampled and digitized (e.g., by the control module 260, the drive 256, or another control module) to generate digital values, respectively, corresponding to the measurements of the sensor. In various implementations, the vehicle 100 may include a combination of analog sensors and digital sensors. For example, the ignition sensor 304, the shore power sensor 308, the door position sensor 336 may be digital sensors. The discharge pressure sensor 312, the suction pressure sensor 316, the return air temperature sensor 320, the plate temperature sensor 324, the box temperature sensor 328, the ambient temperature sensor 332, the battery sensor 344, and the discharge line temperature sensor 352 may be analog sensors.

As discussed further below, the control module 260 controls actuators of the refrigeration system 124 based on various measured parameters, indications, setpoints, and other parameters.

For example, the control module 260 may control the motor 216 of the compressor 204 via the drive 256. The control module 260 may control the condenser fan(s) 220. The condenser fan(s) 220 may be fixed speed, and the control module 260 may control the condenser fan(s) 220 to be either ON or OFF. Alternatively, the condenser fan(s) 220 may be variable speed, and the control module 260 may determine a speed setpoint for the condenser fan(s) 220 and control the condenser fan(s) 220 based on the speed setpoint, for example, by applying a pulse width modulation (PWM) signal to the condenser fan(s) 220.

The control module 260 may also control the EVI valve 232. For example, the control module 260 may control the EVI valve 232 to be open to enable EVI or closed to disable EVI. In the example of the expansion valve 236 being an EXV, the control module 260 may control opening of the expansion valve 236.

The control module 260 may also control the plate control valve 244. For example, the control module 260 may control the plate control valve 244 to be open to enable refrigerant flow through the eutectic plate 268 or closed to disable refrigerant flow through the eutectic plate 268. In the example of the expansion valve 264 being an EXV, the control module 260 may control opening of the expansion valve 264.

The control module 260 may also control the evaporator control valve 248. For example, the control module 260 may control the evaporator control valve 248 to be open to enable refrigerant flow through the evaporator HEX 276 or closed to disable refrigerant flow through the evaporator HEX 276. In the example of the expansion valve 272 being an EXV, the control module 260 may control opening of the expansion valve 272.

The control module 260 may receive a signal that indicates whether the HPCO 262 has tripped (open circuited). The control module 260 may take one or more remedial actions when the HPCO 262 has tripped, such as closing one, more than one, or all of the above mentioned valves and/or turning OFF one, more than one, or all of the above mentioned fans. The control module 260 may generate an output signal indicating that the HPCO 262 has tripped when the discharge pressure of the compressor 204 is greater than a predetermined pressure. The control module 260 may enable operation of the refrigeration system 124 after the HPCO 262 closes in response to the discharge pressure falling below than the predetermined pressure. In various implementations, the control module 260 may also require that one or more operating conditions be satisfied before enabling operation of the refrigeration system 124 after the HPCO 262 closes.

The control module may control the evaporator fan(s) 280. The evaporator fan(s) 280 may be fixed speed, and the control module 260 may control the evaporator fan(s) 280 to be either ON or OFF. Alternatively, the evaporator fan(s) 280 may be variable speed, and the control module 260 may determine a speed setpoint for the evaporator fan(s) 280 and control the evaporator fan(s) 280 based on the speed setpoint, for example, by applying a PWM signal to the evaporator fan(s) 280.

In the case of the CPR valve 288 being an electronic CPR valve, the control module 260 may also control the CPR valve 288. For example, the control module 260 may actuate the CPR valve 288 to limit the suction pressure during startup and later open the CPR valve 288.

The control module 260 may also control operation of the defrost device 180 by activating or deactivating the defrost device 180.

The control module 260 may also control the switches 162 and 166. For example, the control module 260 may switch the switch 162 from the closed state to the open state and switch the switch 166 from the open state to the closed state when the ignition system of the vehicle 100 is OFF and shore power is connected to the vehicle 100 via the receptacle 154. The control module 260 may switch the switch 162 from the open state to the closed state and switch the switch 166 from the closed state to the open state when the ignition system of the vehicle 100 is ON. This may be the case regardless of whether shore power is or is not connected to the vehicle 100. The switches 162 and 166 may be active switches, for example, so the control module 260 can ensure that both switches 162 and 166 are not both in the closed state at the same time.

In various implementations, the switches 162 and 166 may be passive devices configured to have opposite open and closed states based on whether shore power is connected to the vehicle 100. For example, the switch 166 may transition to the closed state and the switch 162 may transition to the open state when shore power is connected to the vehicle 100. The switch 166 may transition to the open state and the switch 162 may transition to the closed state when shore power is not connected to the vehicle 100.

Figure 6:
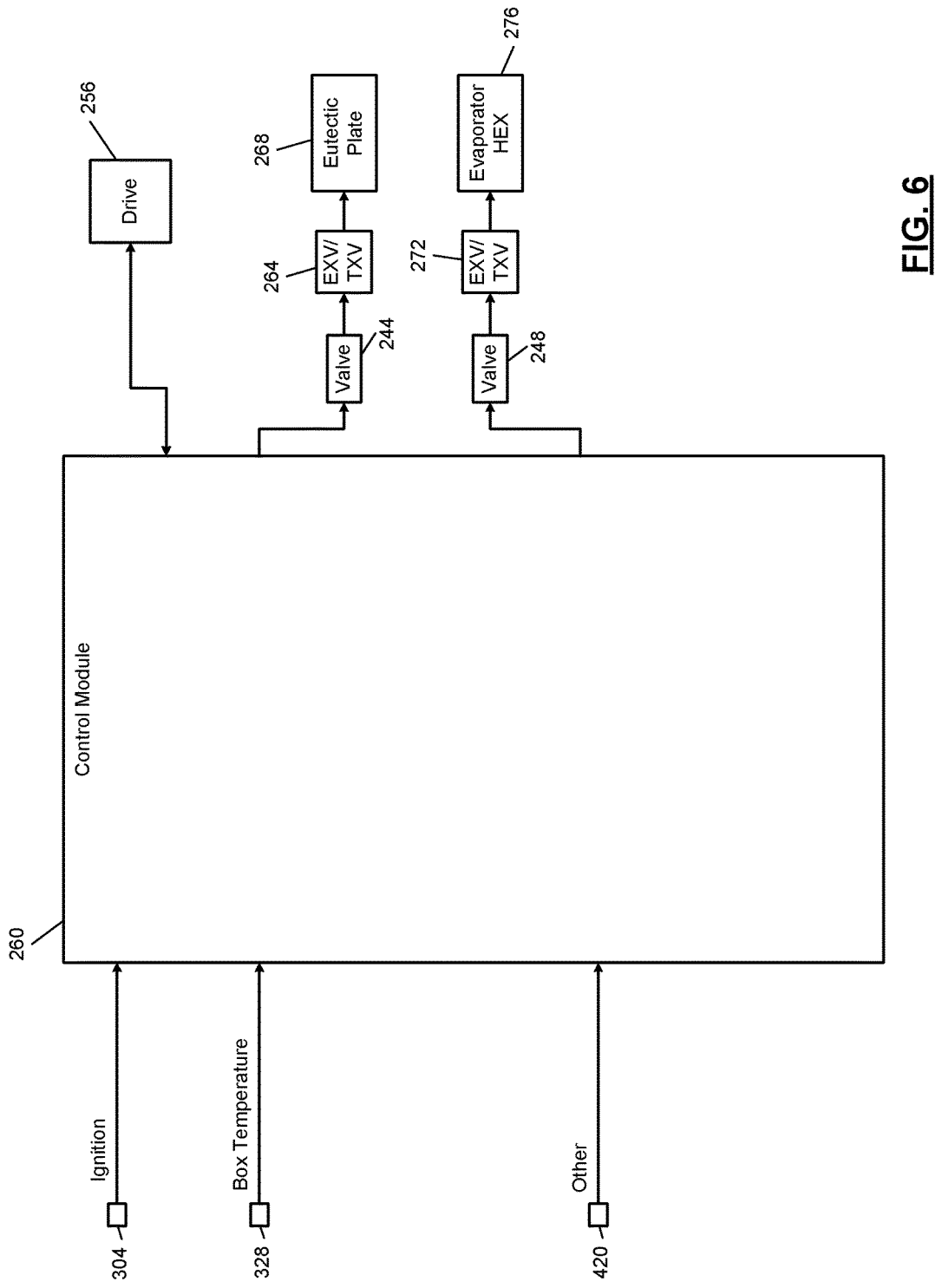
FIG. 6 includes a functional block diagram of an example of the control module for a refrigeration system of a vehicle including modules of the control module, sensors of the vehicle, a eutectic plate, and a HEX evaporator.
Figure 7:
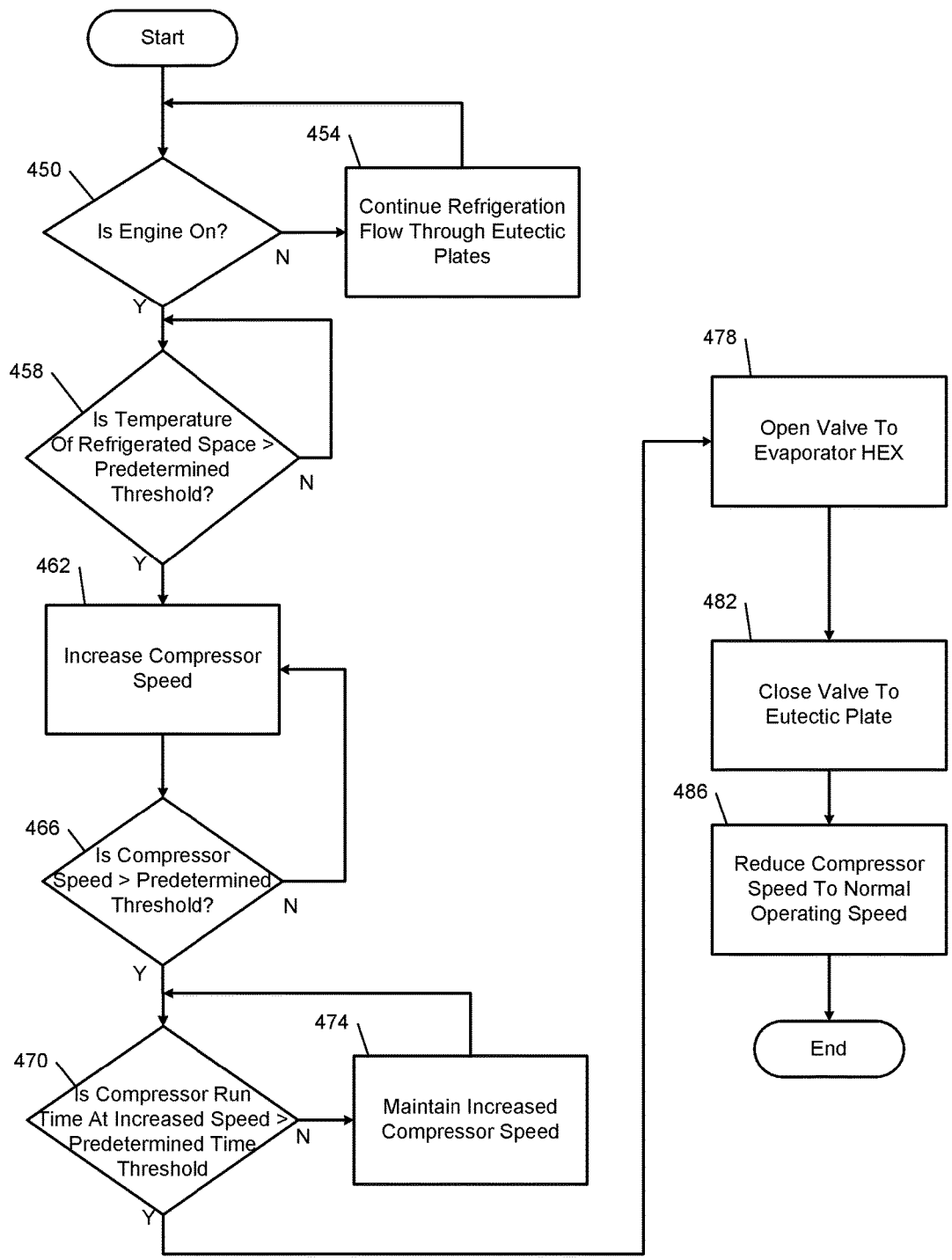
FIG. 7 includes method of controlling an oil or refrigerant return cycle for a refrigerated container of a vehicle in accordance with an embodiment of the present disclosure.

Additionally referring to FIGS. 6 and 7, an example system for controlling an oil return cycle is illustrated. A mixture of refrigerant and oil flows through the eutectic plate 268 to cool the eutectic plate 268, and the control system for the oil return cycle drives the oil/refrigerant mixture in the system back to the compressor 204 prior to closing the eutectic plate 268 off from the system. Referring to FIGS. 5 and 6, the control module 260 receives data output from various sensors and communicates with the compressor drive 256, the eutectic plate valve 244, and the evaporator valve 248 to control the oil return cycle of the system. Example sensors providing data to the control module 260 include the ignition sensor 304, the box temperature sensor 328, and other sensors 420 (examples of other sensors 420 may include the additional sensors listed in FIG. 5).

The control module 260 determines various conditions of the refrigeration system and vehicle, including whether the engine is running and a temperature of the refrigerated space 128. The control module 260 may determine whether the engine 104 is running based on data from the ignition sensor 304, and the control module 260 may determine the temperature of the refrigerated space based on data from the box temperature sensor 328. Further, the control module 260 may command the compressor drive 256 to increase the speed of the compressor 204, may command the evaporator valve 248 to an open position or a closed position, and may command the eutectic plate valve 244 to an open position or a closed position.

The control module 260 may increase the speed of the compressor 204 when the temperature of the refrigerated space 128 is greater than a predetermined temperature threshold. When the temperature of the refrigerated space 128 is greater than the predetermined temperature threshold, the control module 260 determines a need to change the flow of the oil/refrigerant mixture from the eutectic plates to the blower evaporator, or evaporator HEX, 276. The increased temperature condition may happen after door openings. When the flow of the oil/refrigerant mixture is changed from the eutectic plate 268 to the evaporator HEX 276, the eutectic plate 268 is closed off from the remainder of the system. The speed of the compressor 204 is increased to drive the oil/refrigerant mixture (or the oil mixture) in the system back to the compressor 204 prior to closing the eutectic plate 268 off from the system and preventing the oil mixture from becoming trapped within the eutectic plate 268.

To determine whether the temperature of the refrigerated space is greater than the predetermined temperature threshold, the control module 260 may determine the current temperature of the refrigerated space 128 based on data from the box temperature sensor 328 and may compare the current temperature of the refrigerated space to the predetermined temperature threshold. For example only, the predetermined temperature threshold may be a predetermined number of degrees (such as approximately 3 to 5 degrees Fahrenheit) warmer than (i.e., greater than) a desired, predetermined (programmed), or set, refrigerated space temperature (e.g., 35° F. for a medium temperature box and 0° F. or lower for a low temperature box).

The control module 260 communicates with the compressor drive 256 to control a speed of the compressor 204 (shown in FIG. 3). As previously stated, the control module 260 may determine the compressor speed and may increase or reduce the speed of the compressor 204 based on the current temperature of the refrigerated space 128. The compressor speed may be determined based on data output from other sensors 420 (for example, discharge pressure 312, suction pressure 316, and other sensors on or in the compressor 204). The control module 260 may also determine a compressor run time. The compressor run time may be a total time that the compressor has been operational since startup, or the compressor run time may be a time that the compressor has been running at an increased speed (i.e. a speed above a predetermined threshold).

The control module 260 may determine when the compressor speed is at or above the predetermined compressor speed threshold for a predetermined time threshold. The predetermined compressor speed threshold may be determined to provide sufficiently high refrigerant mass flow, but also to be a speed at which the compressor oil circulation level is sufficiently low. A sufficiently high refrigerant mass flow for an example system may be 250 lb/hr, with an oil circulation rate of 0.5%. A sufficiently low compressor refrigerant mass flow level for an example system may be within a range of 50-100 lb/hr. While example mass flow level values are provided, it is understood that the thresholds are system and condition dependent and may be equal to values other than those provided in the examples.

In some examples, the compressor speed may be set to the predetermined normal operating speed, such as approximately 1800 rpm under normal operating conditions, before the control module 260 commands the compressor drive 256 to increase the speed of the compressor 204. The predetermined normal compressor speed of 1800 rpm may produce a predetermined mass flow rate, such as a mass flow rate of approximately 75 lb/hr. In these examples, the predetermined compressor speed threshold reached by the compressor 204 may be within the range of approximately 4000-4500 rpm, producing a greater predetermined mass flow rate, such as a mass flow rate of approximately 250 lb/hr.

The compressor 204 may be held at the increased speed (for example, 4000-4500 rpm) for a predetermined amount of time. Operating the compressor 204 at the increased speed for the predetermined amount of time allows the oil/refrigerant mixture in the refrigeration system, and specifically within the eutectic plate 268, to return to the compressor 204. For example only, the predetermined amount of time may be approximately 5 minutes.

The control module 260 may send a signal commanding the evaporator valve 248 to an open position or a closed position to allow or prevent oil flow to the evaporator HEX 276. When valve 248 is in the open position, the oil/refrigerant mixture is permitted to flow through valve 248, through the expansion valve 272, and to the evaporator HEX 276, as previously described. When valve 248 is in the closed position, the oil/refrigerant mixture is prevented from flowing through valve 248 or evaporator HEX 276. For example, when the compressor speed is above a predetermined speed threshold for a predetermined time, the control module 260 may command the evaporator valve 248 to the opened position to allow the oil/refrigerant mixture to flow to the evaporator HEX 276.

The control module 260 may send a signal commanding the eutectic plate valve 244 to an open position or a closed position to allow or prevent oil flow to the eutectic plate 268. When valve 244 is in the open position, the oil/refrigerant mixture is permitted to flow through valve 244, through the expansion valve 264, and to the eutectic plate 268. When valve 244 is in the closed position, the oil/refrigerant mixture is prevented from flowing through valve 244 or eutectic plate 268. For example, when the compressor speed is above a predetermined speed threshold for a predetermined time, the control module 260 may command the eutectic plate valve 244 to the closed position to prevent the oil/refrigerant mixture from flowing to the eutectic plate 268.

Additionally referring to FIG. 7, a method for controlling an oil return cycle for a refrigerated container of a vehicle is illustrated. At step 450, the method determines whether the engine 104 is on or running. The control module 260 may determine whether the engine 104 is running based on data output from the ignition sensor 304. If the engine 104 is off, valve 244 remains open and refrigeration flow continues to pass through the eutectic plate 268 at step 454. The method will continue to monitor the status of the engine 104 at step 450 until the control module 260 determines that the engine 104 is running. In various implementations, control will continue with 458 when the engine 104 is not running but the vehicle is connected to shore power.

If the engine 104 is running at step 450, the method determines whether the temperature of the refrigerated space 128 is greater than the predetermined temperature threshold at step 458. The control module 260 may determine the temperature of the refrigerated space 128 based on data from the box temperature sensor 328. In some embodiments, the predetermined temperature threshold may be a predetermined number of degrees (such as approximately 3 to 5° F.) warmer than the desired refrigerated space temperature (e.g., 35° F. for a medium temperature box and 0° F. or lower for a low temperature box). If the temperature of the refrigerated space 128 is not greater than the predetermined temperature threshold, the method continues to monitor the temperature of the refrigerated space 128 at step 458. The method will continue to monitor the temperature of the refrigerated space 128 until the control module 260 determines that the temperature of the refrigerated space 128 is greater than the predetermined temperature threshold.

If the temperature of the refrigerated space 128 is greater than the predetermined temperature threshold, the compressor speed is increased at step 462. For example, the control module 260, upon determining that the temperature of the refrigerated space 128 is greater than the predetermined temperature threshold, commands the compressor drive 256 to increase the speed of the compressor 204. In some examples, the control module 260 commands operation of the compressor 204 at a predetermined normal operating speed, such as approximately 1800 revolutions per minute (rpm), during normal operating conditions, producing a mass flow rate of approximately 75 lb/hr. The control module 260 may increase the compressor speed to a predetermined speed or to within a predetermined speed range producing a greater mass flow rate, such as a predetermined mass flow rate. For example, the control module 260 may increase the compressor speed from approximately 4000 rpm to approximately 4500 rpm or to a speed between 4000-4500 rpm, inclusive. The predetermined mass flow rate may be, for example, approximately 250 lb/hr.

At step 466, the method determines whether the compressor speed is greater than the predetermined compressor speed threshold. The predetermined compressor speed threshold may be within the range of approximately 4000-4500 rpm, equivalent to the increased compressor speed targeted by the control module 260. If, at step 466, the compressor speed is not greater than the predetermined compressor speed, the control module 260 continues to increase the compressor speed at step 462. The compressor speed will continue to be increased at step 462 until the control module 260 determines that the compressor speed is greater than the predetermined compressor speed threshold at step 466.

If the compressor speed is greater than the predetermined compressor speed at step 466, the method determines whether the compressor run time at the increased compressor speed is greater than the predetermined time threshold at step 470. The compressor 204 may be held at the increased speed (for example, 4000-4500 rpm) for the predetermined amount of time to allow the oil/refrigerant mixture in the system to return to the compressor 204. For example only, the predetermined amount of time may be approximately 5 minutes. While an example predetermined amount of time is provided, it is understood that the threshold is system and condition dependent and may be equal to values other than 5 minutes. If the compressor run time at the increased compressor speed is not greater than the predetermined time threshold, the method maintains the increased compressor speed at step 474 until the compressor run time exceeds the threshold requirement at step 470.

If, at step 470, the compressor run time at the increased compressor speed is greater than the predetermined time threshold, the valve 248 to the evaporator HEX 276 is opened at step 478. The control module 260 may send a signal commanding the valve 248 to the opened position. When valve 248 is in the open position, refrigerant is permitted to flow through valve 248, through the expansion valve 272, and to the evaporator HEX 276, as previously described.

At step 482, the valve 244 to the eutectic plate 268 is closed. The control module 260 may send a signal commanding the valve 244 to the closed position. When valve 244 is in the closed position, refrigerant is prevented from flowing through valve 244 to eutectic plate 268, as previously described.

To prevent refrigerant flow against a blocked line, operation thru both the evaporator HEX 276 and the eutectic plate 268 must be simultaneously allowed for a short time. For example, the valve 244 and the valve 248 may both be open for a time within a range of approximately 1 to 2 seconds. Once the valve 244 to the eutectic plate 268 is closed at step 482, the compressor operating speed is reduced to the predetermined normal operating speed (for example, approximately 1800 rpm, producing a mass flow rate of approximately 75 lb/hr) at step 486, and the method ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "control module" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A refrigeration system of a vehicle comprising:
a compressor that compresses a refrigerant;
a eutectic plate that cools a refrigerated space, wherein a mixture of the refrigerant and an oil flows through the eutectic plate to cool the eutectic plate;
an evaporator that cools the refrigerated space, wherein the mixture flows through the evaporator; and
a control module that controls the compressor, a first valve that permits or prevents flow of the mixture to the eutectic plate, and a second valve that permits or prevents flow of the mixture to the evaporator;
wherein in response to a temperature of the refrigerated space being greater than a predetermined temperature, the control module:
increases a speed of the compressor;
operates the compressor at the increased speed for a predetermined time period;
after the predetermined period:
opens the second valve to permit flow of the mixture to the evaporator and to decrease the temperature of the refrigerated space; and
closes the first valve to prevent flow of the mixture to the eutectic plate,
wherein the control module opens the second valve before closing the first valve, and
decreases the speed of the compressor after closing the first valve.

2. The refrigeration system of claim 1, wherein the control module:
determines whether an engine of the vehicle is running based on input from an ignition sensor of the vehicle; and
only increases the compressor speed when the engine is running.

3. The refrigeration system of claim 1, wherein the control module:
determines whether an engine of the vehicle is running;
determines whether the vehicle is connected to shore power; and
increases the compressor speed when the engine is not running and the vehicle is connected to shore power.

4. The refrigeration system of claim 1, wherein the control module:
determines the temperature of the refrigerated space based on measurements from a box temperature sensor; and
compares the temperature of the refrigerated space with the predetermined temperature.

5. The refrigeration system of claim 4, wherein the predetermined temperature is a predetermined amount greater than a predetermined refrigerated space temperature.

6. The refrigeration system of claim 1, wherein the predetermined period is calibrated to allow oil in the refrigeration system to return to the compressor.

7. The refrigeration system of claim 6, wherein the predetermined period is five minutes.

8. The refrigeration system of claim 1, wherein the control module increases the compressor speed to within a range of 4000 to 4500 revolutions per minute (rpm).

9. The refrigeration system of claim 1, wherein the control module reduces the speed of the compressor to 1800 revolutions per minute (rpm).

10. The refrigeration system of claim 1 wherein:
the control module increases the compressor speed to within a range of 4000 to 4500 revolutions per minute (rpm), and a mass flow rate of the mixture at the increased speed is 250 pounds per hour (lb/hr); and
the control module reduces the speed of the compressor to 1800 rpm, and a mass flow rate of the mixture when the speed of the compressor is reduced is 75 lb/hr.

11. A method for controlling an oil return cycle for a refrigerated container of a vehicle, the method comprising:
determining whether to change a flow of a mixture of a refrigerant and an oil from a eutectic plate to an evaporator based on a temperature of the refrigerated container being greater than a predetermined temperature;
in response to the temperature of the refrigerated container being greater than the predetermined temperature, increasing an operating speed of a compressor of a refrigeration system;
operating the compressor at the increased operating speed for a predetermined period to change the flow of the mixture;
opening a first valve to permit the mixture to flow to the eutectic plate during the predetermined period;
after the predetermined period:
opening a second valve to permit the mixture to flow to the evaporator to decrease a temperature of the refrigerated container; and
closing the first valve to prevent the mixture to flow to the eutectic plate after opening the second valve,
wherein the opening of the second valve includes opening the second valve before the closing of the first valve; and
reducing the operating speed of the compressor after the closing of the first valve.

12. The method of claim 11, further comprising:
determining whether an engine of the vehicle is running, wherein the increasing the operating speed of the compressor includes increasing the operating speed of the compressor only when the engine is running.

13. The method of claim 11, further comprising:
determining whether an engine of the vehicle is running; and
determining whether the vehicle is connected to shore power,
wherein the increasing the operating speed of the compressor includes increasing the compressor speed when the engine is not running and the vehicle is connected to shore power.

14. The method of claim 11, wherein the predetermined temperature is a predetermined amount greater than a predetermined refrigerated space temperature.

15. The method of claim 11, wherein the predetermined period is calibrated to allow oil in the refrigeration system to return to the compressor.

16. The method of claim 15, wherein the predetermined period is five minutes.

17. The method of claim 11, wherein the increasing the operating speed of the compressor includes increasing the operating speed of the compressor to a range of 4000 to 4500 revolutions per minute (rpm).

18. The method of claim 11, wherein the reducing the operating speed of the compressor includes reducing the operating speed of the compressor to 1800 revolutions per minute (rpm).

19. The method of claim 11, wherein:
the increasing the operating speed of the compressor includes increasing the operating speed of the compressor to a range of 4000 to 4500 revolutions per minute (rpm);
a mass flow rate of the mixture at the increased operating speed is 250 pounds per hour (lb/hr);
the reducing the operating speed of the compressor includes reducing the operating speed of the compressor to 1800 rpm; and
a mass flow rate of the mixture when the operating speed of the compressor is reduced is 75 lb/hr.

20. The method of claim 11 wherein the closing the first valve includes closing the first valve within a range of one to two seconds after the opening of the second valve.

* * * * *